W. A. McCOLLOUGH.
HOPPER FOR FEEDING TROUGHS.
APPLICATION FILED JAN. 6, 1917.

1,252,594.

Patented Jan. 8, 1918.

INVENTOR:
W. A. McCOLLOUGH

By Earl M. Sinclair
Atty.

UNITED STATES PATENT OFFICE.

WILLIAM A. McCOLLOUGH, OF WEBSTER CITY, IOWA.

HOPPER FOR FEEDING-TROUGHS.

1,252,594.  Specification of Letters Patent.  Patented Jan. 8, 1918.

Application filed January 6, 1917. Serial No. 140,866.

*To all whom it may concern:*

Be it known that I, WILLIAM A. McCOLLOUGH, citizen of the United States of America, and resident of Webster City, Hamilton county, Iowa, have invented a new and useful Hopper for Feeding-Troughs, of which the following is a specification.

The object of this invention is to provide an improved construction for a hopper adapted to contain and feed various forms of food to a feeding trough.

A further object of this invention is to provide improved means for adjusting the hopper to facilitate the transmission of different kinds of fodder to a trough.

A further object of this invention is to provide improved means for forcefully transferring granular fodder from a hopper to a trough.

A further object of this invention is to provide improved means adapted to be actuated by animals in feeding, for forcing granular fodder from a superposed hopper to a trough.

My invention consists in the construction, arrangement and combination of elements hereinafter set forth, pointed out in my claims and illustrated by the accompanying drawing, in which—

Figure 1:
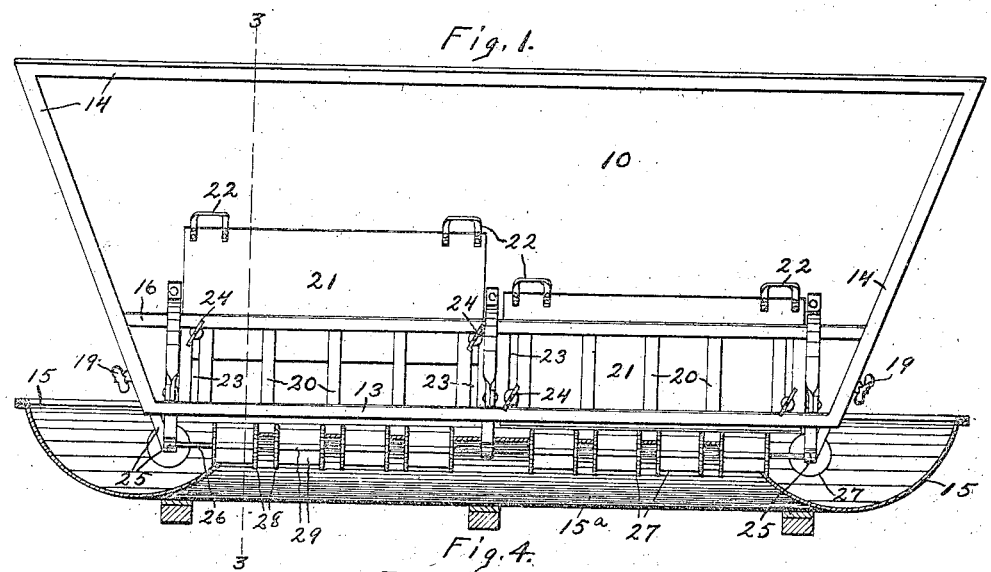
Figure 2:
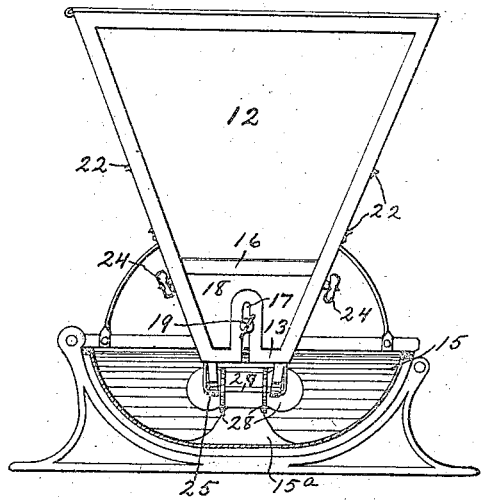
Figure 3:
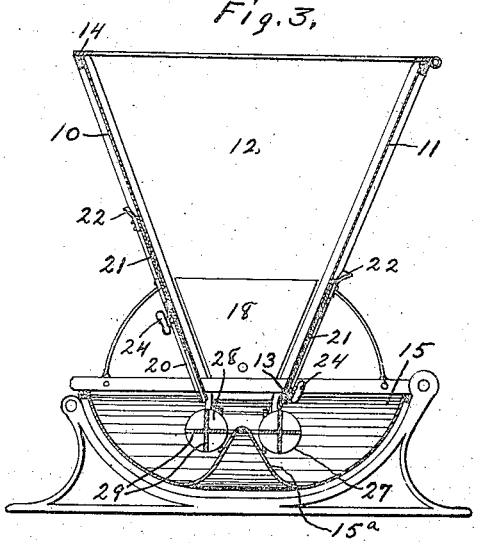

Figure 1 is a side elevation of my improved hopper in position for practical use, the underlying trough being shown in section. Fig. 2 is an end elevation of the same, the trough being shown in section. Fig. 3 is a cross-section on the line 3—3 of Fig. 1.

Figure 4:
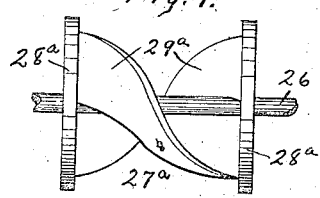

Fig. 4 is a detail elevation, on an enlarged scale, showing a modified form of the force-feeding device.

In the construction of the device as shown a hopper is formed of side walls 10, 11 and end walls 12, said walls preferably being separately formed of sheet metal and secured together and to bottom frame members 13 and other frame members 14, of bar metal or angle iron, in a common manner. The hopper so formed preferably tapers from its top to its bottom, is open at its bottom, said opening being relatively long and narrow; and is adapted to be mounted in any row; and is adapted to be mounted in any desired manner above and have its bottom opening within and along the median line of a feeding trough such as 15, of any desired form. A girdle bar 16 is mounted around and fixed in places to the hopper and is spaced above the lower margins thereof.

The ends 12 of the hopper are cut away at the horizontal plane of the girdle bar 16, thus leaving open spaces below said girdle bar and above the bottom frame members 13. The sides 10, 11 of the hopper also are cut away, wholly or in part, at the horizontal plane of the girdle bar 16, thus leaving open spaces between said girdle bar and the bottom frame members 13. At the ends of the hopper the bottom frame members 13 are looped upwardly and recurved in their central portions, to form vertical guides 17, one of which is shown in Fig. 2. Tapered shields 18 are slidably mounted within and against the inner faces of end members 12 of the hopper and are adapted to close or adjust the size of the open spaces at the ends of said hopper. The sliding shields 18 are formed with bolts projecting through the vertical guides, on which bolts wing nuts 19 are mounted and are adapted to be tightened to hold said shields in any position in which they may be adjusted. Rack bars 20 are fixed at their upper ends to the girdle bar 16 at the sides of the hopper, and at their lower ends to the lower frame members 13, thus dividing the lower open portions of the hopper sides into several feeding spaces. Side shields 21 are provided, in this instance there being four in number, two on each side of the hopper, and said shields are slidably mounted between the outer faces of the sides 10 and 11 of the hopper, and the girdle bar 16 and rack bars 20. The side shields 21 are provided with handles 22 at their upper margins, for manually sliding said shields, and said shields are adapted to close, to greater or less extent, the open spaces at the bottom of the sides of the hopper. Certain of the rack bars 20, adjacent the ends of the side shields 21, are arranged closely adjacent each other to form narrow vertical guides 23. Bolts are provided on the side shields 21 and project through the vertical guides 23, and wing nuts 24 are mounted thereon and adapted to frictionally engage the outer faces of said guides to hold the shields in their adjusted positions.

The hopper constructed as above described is designed to be used to contain fodder of various kinds to be fed to stock, either directly from said hopper or from the underlying trough 15, to which trough portions of said fodder are transferred from the hopper. When it is desired to feed coarse fodder, such as hay, the shields 18 and 21 may be raised as indicated at the left of Figs. 1 and 3, so that such fodder may be taken from the open spaces at the bottom of the hopper, as between the rack bars 20. It will be observed that the vertical guides 17 at the ends of the hopper, and the rack bars 20, form a skeleton lower portion for the hopper, suitable for feeding of hay and like feeds, when the slides are in elevated position. When it is desired to feed granular feed, such as shelled corn or other grains, the shields 18 and 21 are lowered so that their lower margins are approximately coincident with the lower frame bars 13, and in this event the granular feed flows from the open bottom of the hopper to the trough 15, such flow being limited by the restricted construction of such opening and by the piling up of the feed along the median line of the trough, and the supply being automatically replenished as it is used, in a common and well known manner.

Brackets 25 are fixed to and extend below the lower margin of the hopper, said brackets preferably being continuations of certain of the frame members of the hopper. Rods or spindles 26 are carried by the brackets 25 and extend lengthwise beneath and parallel with the side margins of the hopper, and beneath and parallel with end margins of the hopper, one of said rods or spindles being provided for each margin of the open bottom of said hopper. Force-feeding devices, indicated generally by the numerals 27, are rotatably mounted on the rods or spindles 26, and said feeding devices preferably extend, either end to end or slightly spaced apart, throughout the periphery of the bottom of the hopper. Each feeding device, in the embodiment shown in Figs. 1, 2 and 3, comprises spaced disk-shaped heads 28 perforated at their centers for mounting on the rods or spindles 26, and wings 29 connecting said heads and preferably radiating from the axis of the device to the circumference thereof. The wings 29 preferably are four in number and arranged at right angles to each other, thus forming four longitudinal compartments in each device between the heads 28 thereof, said compartments opening to the periphery of the device. The feeding devices preferably are so arranged, as clearly shown in Fig. 3, that when any one wing 29 is in vertical position its upper margin is in close proximity to the lower margin of a lowered shield 18 or 21, and other adjacent wings extend horizontally, those which extend inwardly forming partial closures for the open bottom of the hopper. In case a trough 15 is employed having a central partition or ridge 15ª, as here illustrated, the feeding devices may be so arranged that the horizontally extending wings approach closely to said partition or ridge, as shown clearly in Fig. 3, thereby substantially closing the bottom of the hopper.

When animals, such as swine, are feeding from the trough 15, their snouts will continually contact with the feeding devices 27, particularly the outwardly extending wings thereof, thereby causing a rotation of the devices. This rotation of the devices 27 will cause quantities of the grain in the hopper to be transferred to the trough, through the action of the wings 29, thus insuring at all times a sufficient supply of feed being passed from the hopper to the trough while the animals are feeding. During such time as no animals are feeding from the trough, or from any portion thereof, the devices 27 tend to prevent flow of grain from the hopper. It is designed that one of the feeding devices 27 be provided for each animal to be fed from the trough, to the normal capacity thereof, approximately.

In the construction according to Fig. 4 the feeding device 27ª is formed with spaced heads 28ª connected by spirally arranged wings 29ª, whereby spiral compartments are formed extending generally longitudinally of the device. The general action is the same as previously described, except that, particularly, a small quantity of grain is fed continuously to the trough during rotation of the device, rather than larger quantities being delivered intermittently, as in the case of the devices 27, as each wing 29 comes to position for discharge.

I claim as my invention—

1. A hopper for feeding troughs, comprising a tapering body open at its bottom, said body being formed with cut-away portions adjacent its lower margin, a girdle bar embracing said body adjacent the top of said cut-away portions, a frame bar embracing the body adjacent its lower margin, and shields slidingly mounted between said body and the girdle and frame bars and adapted adjustably to cover said cut-away portions.

2. A hopper for feeding troughs, comprising a tapering body open at its bottom, the sides of said body being cut away adjacent their lower margins, a girdle bar embracing said body adjacent the top of said cut away portions, a frame bar embracing said body adjacent its lower margin, rack bars connecting said girdle bar and frame bars, and shields slidingly mounted between said body and the girdle and rack bars.

3. A hopper for feeding troughs, comprising a body open at its bottom, the sides of said body being cut away adjacent their lower margins, a girdle bar embracing said body adjacent the top of said cut away portions, a frame bar embracing said body adjacent its bottom, spaced rack bars connecting said girdle bar and frame bar, shields slidingly mounted between said body and the girdle and rack bars, vertical guides being formed between said girdle and frame bars, and studs on said shields projecting through said vertical guides, together with securing means on said studs for frictionally engaging said guides.

4. A hopper for feeding troughs, comprising a body open at its bottom, spaced brackets fixed to and projecting below the lower margin of said body, a spindle fixed in said brackets parallel with and spaced from the lower margin of said body, and force-feeding devices carried by said spindle, each of said devices comprising a tubular member rotatably mounted on said spindle, spaced heads on said tubular member, and radially projecting wings on said tubular member between and connecting said heads.

Signed by me at Webster City, Iowa, this 2d day of January, 1917.

WILLIAM A. McCOLLOUGH.

Copies of this patent may be obtained for five cents each, by addressing the "Commissioner of Patents, Washington, D. C."